United States Patent
Hucks et al.

(10) Patent No.: US 6,703,473 B2
(45) Date of Patent: Mar. 9, 2004

(54) PROCESS FOR PRODUCING POLYCARBONATE

(75) Inventors: Uwe Hucks, Alpen (DE); Kaspar Hallenberger, Leverkusen (DE); Silke Kratschmer, Krefeld (DE); Michael Prein, Brasschaat (BE); Steffen Kühling, Meerbusch (DE)

(73) Assignee: Bayer Aktiengesellschaft, Leverkusen (DE)

( * ) Notice: Subject to any disclaimer, the term of this patent is extended or adjusted under 35 U.S.C. 154(b) by 96 days.

(21) Appl. No.: 10/038,953

(22) Filed: Jan. 2, 2002

(65) Prior Publication Data

US 2002/0095020 A1 Jul. 18, 2002

(30) Foreign Application Priority Data

Jan. 5, 2001 (DE) .......................... 101 00 404

(51) Int. Cl.[7] .............................................. C08G 64/00
(52) U.S. Cl. .................... 528/196; 422/131; 526/67; 526/68; 528/198; 558/268; 558/270; 558/271; 558/274
(58) Field of Search ................. 528/196, 198; 422/131; 526/67, 68; 558/268, 274, 270, 271

(56) References Cited

U.S. PATENT DOCUMENTS

| 5,189,139 A | 2/1993 | Tuinstra et al. ............. 528/196 |
| 5,336,750 A | 8/1994 | Tuinstra et al. ............. 528/196 |
| 5,734,004 A | 3/1998 | Kühling et al. ............. 528/196 |
| 5,922,827 A | 7/1999 | Nishihira et al. ........... 528/196 |
| 6,277,945 B1 | 8/2001 | Hachiya et al. ............. 528/196 |
| 6,316,575 B1 * | 11/2001 | Kuze et al. ................. 528/196 |
| 6,323,302 B1 | 11/2001 | Sasaki et al. ............... 528/196 |

FOREIGN PATENT DOCUMENTS

| EP | 1 018 529 | 7/2000 |
| JP | 2000-128976 | 5/2000 |
| LU | 30 729 | 11/1951 |
| LU | 88 569 | 4/1995 |

* cited by examiner

*Primary Examiner*—Terressa M. Boykin
(74) *Attorney, Agent, or Firm*—Joseph C. Gil; Aron Preis; James R. Franks

(57) ABSTRACT

An improvement to the melt transesterification reaction of diaryl carbonate with dihydroxy aryl compound is disclosed. The improvement entails the following steps (i) introducing the resulting vapor stream at the mid-height of a first distillation column, and (ii) separating the vapor stream into a top product containing high purity monohydroxy aryl compound and a first bottom product, and (iii) recycling the high purity monohydroxy aryl compound of (ii) to the reaction, and (iv) introducing the first bottom product at mid-height of a second distillation column, and (v) separating said first bottom product into high boiling bottom by-product and overhead remaining constituents, and (vi) introducing the overhead remaining constituents at mid-height of a third distillation column, and (vii) separating said overhead remaining constituents into overhead low-boiling fractions and bottom or product side stream that contains diaryl carbonate product, and (viii) recycling the diaryl carbonate product directly to the transesterification reaction.

4 Claims, 1 Drawing Sheet

PROCESS FOR PRODUCING POLYCARBONATE

CROSS REFERENCE TO RELATED PATENT APPLICATION

The present patent application claims the right of priority under 35 U.S.C. §119 (a)–(d) of German Patent Application No. 101 004 04.4, filed Jan. 5, 2001.

FIELD OF THE INVENTION

The present Application relates to a process for producing polycarbonate by the transesterification and to the recovery of diaryl carbonate produced thereby.

SUMMARY OF THE INVENTION

The present Application relates to a process for producing polycarbonate by the transesterification in the melt of diaryl carbonates with dihydroxy aryl compounds. The vapor streams generated in the course of the process contain diaryl carbonate (DAC) that in accordance with the invention is recovered in high quality. The recovered DAC may be reused in the transesterification process. The monohydroxy aryl compounds isolated in high purity in course of the claimed process may be reused either for the production of diaryl carbonate as well as for the production of dihydroxy aryl compounds.

BACKGROUND OF THE INVENTION

For the production of polycarbonate by transesterification in the melt, dihydroxyaryl compounds are reacted with diaryl carbonate, wherein the monohydroxy aryl component is separated from the diaryl carbonate in the sense of a transesterification reaction. This condensation reaction initially results in the formation of low molecular weight polycarbonate oligomers, which react further to form high molecular weight polycarbonates as the separation of monohydroxy aryl components proceeds. The progress of the reaction can be assisted by the use of suitable catalyst. Moreover, in order to obtain high molecular weights, it is necessary to remove the monohydroxy aryl component which is formed from the reaction space and thus to assist the progress of the reaction. Various measures are implemented industrially in order to efficiently remove the monohydroxy aryl component, such as increasing the temperature of the reaction medium, reducing the pressure in the gas space over the reaction medium, flashing the reaction mixture into a gas space under reduced pressure, introducing inert gases or the vapors of volatile solvents as entraining agents, and the use of special reaction apparatuses which assist the removal of the monohydroxy aryl component by a continuous renewal of the surface, particularly if highly viscous melts are produced. In all the aforementioned embodiments, gaseous vapor streams are produced, which mainly contain the monohydroxy aryl component of the diaryl carbonate. Depending on the type of dihydroxy aryl compound used and on the diaryl carbonate used, the mass of the vapor stream which is obtained can be greater than the mass of the polycarbonate which is obtained. Reuse of the vapor stream obtained is therefore necessary in order to achieve economic production of polycarbonate by the method of transesterification in the melt.

One very important industrial process is the production of high molecular weight polycarbonate from 2,2-bis(4-hydroxyphenyl)-propane bisphenol A; hereinafter called BPA) and diphenyl carbonate hereinafter called DPC). In this case, the aforementioned vapor streams mainly consist of phenol. The phenol which is obtained in the course of this process can be reused in the sense of a recycling operation for producing DPC, which has been published for the first time in Schnell Chemistry and Physics of Polycarbonates, Polymer Reviews, H. Schnell, Vol. 9, J. Wiley and Sons, Jnc (1964). Further details to the reuse of the phenol as obtained are found for example in WO 93/3084 and LU A 88569. LU A 88564 also describes the use of the phenol obtained for the production of BPA by reaction with acetone. Both for the production of DPC and for the production of BPA, stringent demands are imposed on the purity of the phenol used in order to obtain products of high quality.

U.S. Pat. No. 5,922,827 describes a process for the reuse of the phenol from the transesterification of diphenols and diaryl carbonates. The phenol obtained is used there for producing diaryl oxalate by conversion of dialkyl oxalates by transesterifications into diaryl oxalates which in turn is converted by decarbonylation into diaryl carbonate.

There is no mention of the reuse of DAC in the above patent, however. In U.S. Pat. No. 6,277,945 B1 as well as Japanese Specifications JP 2000053759 A and JP 2000128976 A, phenol is also recovered from the transesterification process and is used for the production of BPA or DPC. In EP A 992 522, a monohydroxyaryl compound is likewise recovered from the transesterification process, but is only used as a solvent/support for the catalyst which is added.

In the practical production of polycarbonates, it has been shown that in addition to the monohydroxy aryl compound of the diaryl carbonate, which is the main component, the vapor streams also contain other components which are either present in the reaction medium directly or which are formed under the prevailing reaction conditions by secondary reactions from components of the reaction medium. Examples of secondary components such as these which can be formed include diaryl carbonates, dihydroxy aryl compounds, catalyst residues or secondary products of spent catalysts, as well as cleavage and rearrangement products of the diaryl carbonate used and of the dihydroxy aryl compounds used, and secondary products thereof. In the case of the industrially important synthesis of polycarbonates from BPA and DPC, the vapor streams contain, in addition to phenol, secondary components such as DPC, BPA, low molecular oligomers from BPA and DPC phenyl salicylate, isopropenylphenol and dimers and oligomers thereof, hydroxyindanes, hydroxychromanes, catalyst residues and secondary products thereof. In particular, the content of DPC in the vapor streams may, under some polycondensation reaction conditions, be greater than 5% by weight in the vapor streams. In the conventional process, this valuable substance is thus lost in not inconsiderable amounts.

Furthermore, additional by-products may also occur in the vapor streams under the prevailing conditions, even after the separation of the polycarbonate, due to cleavage and/or recombination reactions of the aforementioned secondary components. Thus, for example, the reaction of isopropenylphenol and phenol in the vapor streams may result in the formation of BPA.

In principle, separation of the aforementioned secondary components, such as isopropenylphenol, phenyl salicylate or hydroxyindanes, from the polycarbonate melt via the gas phase is desirable, since a higher purity of the polycarbonate obtained would be achieved by the removal of these components. However, the presence of these secondary components in the vapor streams means that the phenol obtained from the condensation of the vapor streams cannot be used directly for producing DPC or BPA or for other chemical reactions, since extremely high purity criteria are generally imposed on the phenol used for reactions such as these. High purity phenol may in fact be obtained from the vapor streams by customary purification methods such as simple distillation or recrystallisation, but valuable substances such as DPC, which are present as secondary components, are not isolated for reuse by such methods.

The above processes therefore have the disadvantage that the DPC which is used in excess is incinerated with the bottom product which remains from the recovery of phenol by distillation. DPC may be present in the bottom product at a content of about 90% by weight, which therefore results in a considerable loss of DPC.

Attempts to obtain highly pure DPC by overhead distillation have generally resulted in failure, on account of the secondary reactions which occur at the high bottom product temperatures which are required.

Thus the object of the present invention, starting from the prior art was to provide a process for producing polycarbonate by means of transesterification in the melt, which makes it possible to recover unreacted diaryl carbonate with high purity from the vapor streams and which at the same time considerably reduces the consumption of raw materials.

Ideally, success should be achieved with a process such as this in separating the vapor streams from the production of polycarbonates by means of transesterification in the melt by a suitable combination of purification operations so that valuable materials (which are generally the monohydroxy aryl compound of the diaryl carbonate and the diaryl carbonate, and in the situation exemplified, namely the production of polycarbonate from BPA and DPC, these are phenol and DPC) are isolated at high yield, wherein the monohydroxy aryl compound which is obtained is of sufficient purity for the production of the corresponding diaryl carbonate and the isolated diaryl carbonate is of sufficient purity to be recycled as a raw material directly to the polycarbonate synthesis comprising transesterification in the melt, without impairing the quality of the polycarbonate. Ideally, secondary components from the process should be removed as completely as possible, and the amount of non-reusable residual substances from the work-up of the vapor, which have to be disposed of, should be <5%, preferably <4%, most preferably <3.5% with respect to the amount introduced into the vapor work-up stage, in order to achieve a low level of unwanted losses of material.

DETAILED DESCRIPTION OF THE INVENTION

Figure 1:
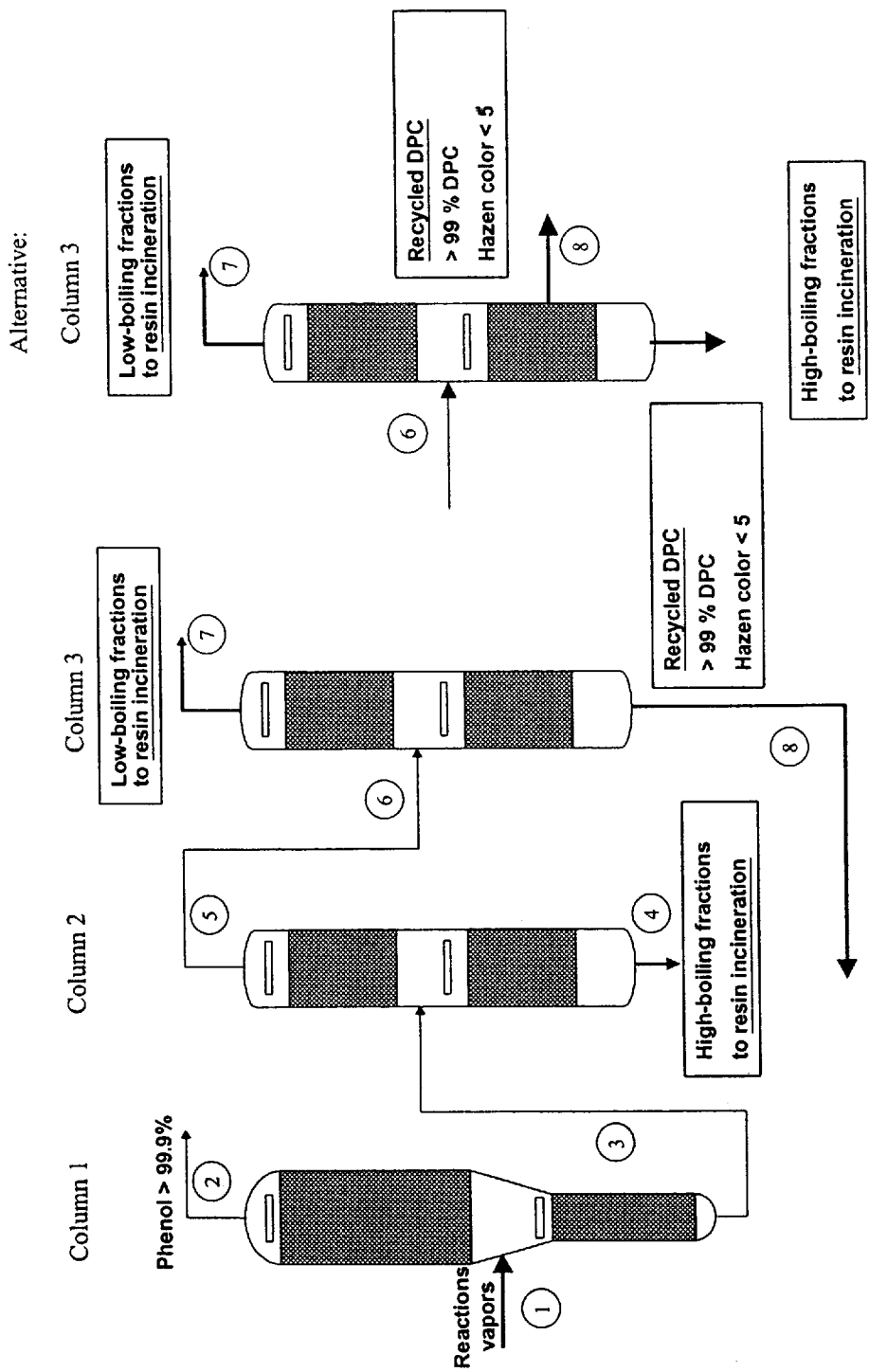
FIG. 1 illustrates the process of the invention.; The reaction vapors are fed into the 1st column at the mid-height (1) thereof, are separated overhead with the high-purity phenol (2) and are recycled, e.g. to the diaryl carbonate synthesis stage. The bottom product (3) is in turn fed at mid-height into a second column, in which the high-boiling by-products are separated via the bottom product (4), and the remaining constituents are fed overhead and at mid-height (6) into a third column from which the low-boiling fractions are then taken off overhead (7) and are fed together with the bottom product from column 2 to a resin incineration stage, whilst the bottom product from the third column, which consists of diaryl carbonate of outstanding Hazen color, is taken off via (8) and is recycled directly to the transesterification process. Alternatively, it is possible to take off the diaryl carbonate as described above as a side stream from the third column.

Surprisingly, a process for producing polycarbonate has now been identified which achieves this object. The process according to the invention is characterized by a step comprising the work-up of the combined vapor streams, which makes it possible to separate the monohydroxy aryl compound, diaryl carbonate and the byproducts from the reaction vapors by distillation, wherein the surprisingly high quality of the substances which are recovered in this manner enables them to be reused directly for the synthesis of diaryl carbonate or a dihydroxy aryl compound (monohydroxyaryl compound) or for transesterification in the melt (diaryl carbonate).

The present Application accordingly relates to a process for producing polycarbonate by the transesterification of a diaryl carbonate and an aromatic dihydroxy aryl compound to form oligo-/polycarbonate by splitting of the monohydroxyaryl compound, wherein the monohydroxy aryl compound which is produced can be reused for producing diaryl carbonate or a dihydroxyaryl compound, which in turn can be used in the transesterification process, characterized in that the monohydroxy aryl compound is separated by distillation in such a way that the excess diaryl carbonate is simultaneously recovered in a quality such that it can be recycled directly to the melt transesterification process.

The process is illustrated schematically, and in simplified form, in the following flow diagram:

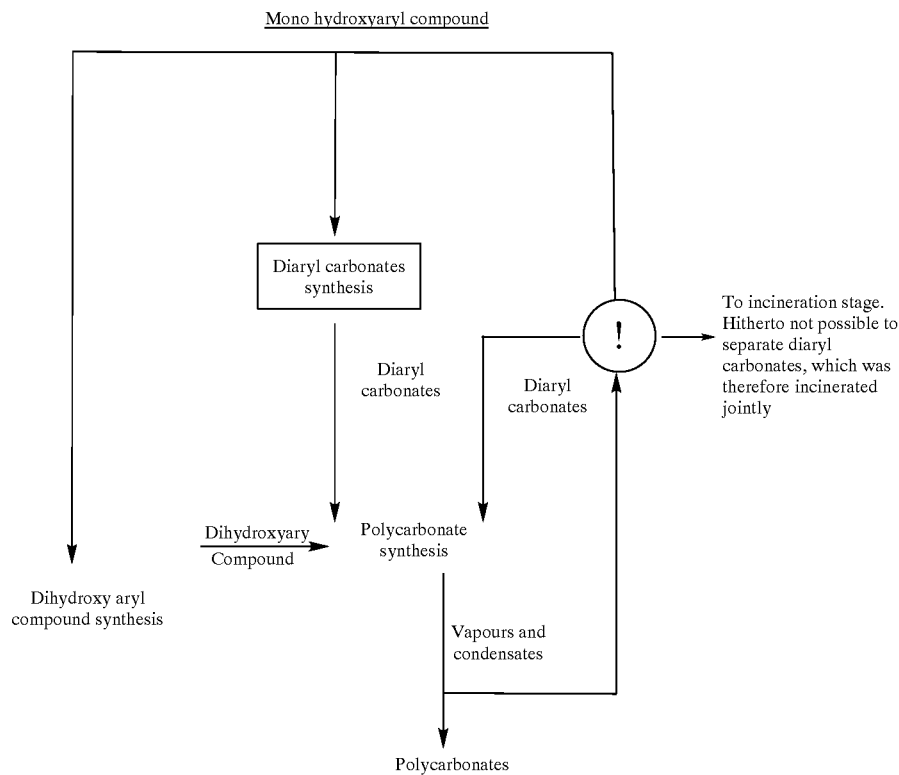

Separation according to the invention of the monohydroxy aryl compounds and of the diaryl carbonate is effected in a special sequence of separation stages which differs from customary distillation trains in that the diaryl carbonate in the last column is not taken off overhead, but instead the bottom product of the column is taken off in high purity. Surprisingly, it is also possible as an alternative to effect separation of the diaryl carbonate by taking off a side stream from the last column.

The sequence of separation stages which is familiar to one skilled in the art is in case of the industrially important transesterification process to produce polycarbonate from Bisphenol A (BPA) and diphenyl carbonate (DPC) one in which the low-boiling phenol is taken off overhead from the 1st column, the somewhat less volatile impurities which vaporize are separated overhead from the 2nd column, and the diaryl carbonate is distilled from the 3rd column overhead, whilst the heavy-boiling impurities remain in the bottom product of the 3rd column. High-purity diaryl carbonate cannot be obtained by this process, however.

Surprisingly, the possibility of taking off diaryl carbonate of outstanding quality from the bottom product respectively from a side stream enables a lower column temperature to be used, and prevents the decomposition of diaryl carbonates and others of the present compounds, which is otherwise observed and which has hitherto prevented the effective recovery by distillation of highly pure diaryl carbonate from the vapors.

The sequence of separation stages according to the invention is illustrated in FIG. 1.

The reaction vapors are fed into the 1 st column at the mid-height (1) thereof, are separated overhead with the high-purity monohydroxy aryl compound (2) and are recycled, e.g. to the diaryl carbonate or the dihydroxy aryl compound synthesis stage. The bottom product (3) is in turn fed at mid-height into a second column, in which the high-boiling by-products are separated via the bottom product (4), and the remaining constituents are fed overhead and at mid-height (6) into a third column from which the low-boiling fractions are then taken off overhead (7) and are fed together with the bottom product from column 2 to a resin incineration stage, whilst the bottom product from the third column, which consists of diaryl carbonate of outstanding Hazen color and Quality is taken off via (8) and is recycled directly to the transesterification process to produce polycarbonate. Alternatively, it is possible to take off the diaryl carbonate as described above as a side stream from the third column.

The purity of the monohydroxy aryl compound which is separated overhead in the process according to the invention is >99%, preferably >99.8%, most preferably >99.95%. The purity of the diaryl carbonate (8) is >99.0%, preferably >99.5%, most preferably >99.9%. The diaryl carbonate which is thus recovered is characterized by a Hazen color less than 5.

The secondary component which is separated as a purge in the sense of the process amounts to <5%, preferably <4%, most preferably <3.5%, with respect to the amount of vapors introduced into the vapor work-up stage.

Therefore, whereas in the process comprising the removal of monohydroxy aryl compound from the vapor streams of the transesterification process which was known hitherto, the remaining residues were incinerated, including the diaryl carbonate present therein, in the process according to the invention the diaryl carbonate is also isolated in high purity and is recycled to the process. This results in a saving of raw materials and in a reduction both of off-gases and of energy.

Diphenols which are suitable for the process according to the invention are those of formula (1):

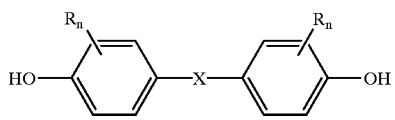

(1)

wherein X=a $C_1$–$C_8$ alkylidene or cycloalkylidene, S, $SO_2$, O, C=O or a single bond, R=$CH_3$, Cl or Br and n=zero, 1 or 2.

Examples of preferred diphenols include:
4,4'-dihydroxydiphenyl,
α,α'-bis-(4-hydroxyphenyl)-m-diisopropylbenzene,
4,4'-dihydroxydiphenyl sulphide,
2,2-bis-(4-hydroxyphenyl)-propane,
2,2-bis-(3,5-dimethyl4-hydroxyphenyl)-propane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-cyclohexane, and
1,1-bis-(4-hydroxyphenyl)-3,3,5-trimethylcyclohexane.

Phenols which are particularly preferred from those mentioned above are 4,4'-dihydroxy-diphenyl, α,α'-bis-(4-hydroxyphenyl)-m-diisopropylbenzene, 2,2-bis-(4-hydroxy-phenyl)-propane and 1,1-bis-(4-hydroxyphenyl)-3,3,5-trimethylcyclohexane. 2,2-bis-(4-hydroxyphenyl)-propane is most particularly preferred.

When mono hydroxy aryl compounds recovered from the 1st column are used directly for the production of dihydroxy aryl compounds, it has to be ensured that the aryl compounds which are used each time bear the same substituents. Either one dihydroxy aryl compound of formula (1) can be used for the formation of homopolycarbonates, or a plurality of dihydroxy aryl compounds of formula (1) can be used for the formation of copolycarbonates.

Diaryl carbonates in the sense of present invention are di-$C_6$–$C_{14}$ aryl carbonates, preferably carbonates of phenol or alkyl-substituted phenols, namely diphenyl carbonate or dicresyl carbonate, for example. 1.01 to 1.30 mol, preferably 1.02 to 1.2 mol, of diaryl carbonates diesters are used with respect to 1 mol of dihydroxy aryl compound.

The diaryl carbonates are produced in the known manner (EP A 0 483 632, 0 635 476, 0 635 477 and 0 645 364) by the phosgenation (in solution, in the melt or in the gas phase) of monohydroxy aryl compound.

The diaryl carbonates can also be produced by the direct oxidation of monohydroxy aryl compounds with CO and oxygen or other oxidising agents (see DE OS 27 38 437, 28 15 512, 27 38 488, 28 15 501, 29 49 936, 27 38487 etc., for example).

The polycarbonates can be deliberately branched, in a controlled manner, by the use of small amounts of branching agents. Examples of some suitable branching agents are as follows:
phloroglucinol,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-[4,4-bis-(4-hydroxyphenyl)-cyclohexyl]-propane,
2,4-bis-(4-hydroxyphenyl-isopropyl)-phenol,
2,6-bis-(2-hydroxy-5'-methyl-benzyl)-4-methylphenol,
2-(4-hydroxyphenyl)-2-(2,4-dihydroxyphenyl)-propane,
hexa-(4-(4-hydroxyphenyl-isopropyl)-phenyl)-orthoterephthalic acid ester,
tetra-(4-hydroxyphenyl)-methane,
tetra-(4-(4-hydroxyphenyl-isopropyl)-phenoxy)-methane,
isatin-bis-cresol,
pentaerythritol,
2,4-dihydroxybenzoic acid,
trimesic acid,
cyanuric acid,
1,4-bis-(4',4"-dihydroxytriphenyl)-methyl)-benzene, and
α,α',α"-tris-(4-hydroxyphenyl)-1,3,4-triisopropenylbenzene.

1,1,1-tri-(4-hydroxyphenyl)-ethane and isatin-bis-cresol are particularly preferred.

The 0.05 to 2 mol % of branching agents which are optionally used in conjunction with respect to the dihydroxy aryl compound used can be introduced together with the dihydroxy aryl compound.

It must be ensured that the reaction components for the first step, namely transesterification, i.e. the dihydroxy aryl compound and the diaryl carbonate are free from alkali and alkaline earth cations, although amounts of alkali and alkaline earth cations less than 0.1 ppm can be tolerated. Pure diaryl carbonate or dihydroxy aryl compound of this type can be obtained by recrystallisation, washing or distilling the diaryl carbonate or dihydroxy aryl compound. In the process according to the invention, the content of alkali and alkaline earth cations should be <0.1 ppm, both in the dihydroxy aryl compound and in the diaryl carbonate.

The transesterification reaction between the aromatic dihydroxy aryl compound and the diaryl carbonate in the melt is preferably conducted in two stages. In the first stage of the industrially applied process of producing polycarbonate by reacting diphenyl carbonate (DPC) with bisphenol A (BPA), at normal pressure, fusion occurs of the BPA and of the DPC at temperatures from 80–250° C., preferably 100–230° C., most preferably 120–190° C. in 0–5 hours, preferably 0.25–3 hours. After adding the catalyst, the oligocarbonate is produced from the DPA and the DPC by distilling off the phenol by applying a vacuum (up to 2 mbar) and increasing the temperature (up to 260° C.). The bulk of the vapor is produced from the process in the course of this procedure. The oligocarbonate which is thus produced has an average molecular weight Mw (as determined by measuring the relative solution viscosity in dichloromethane or in mixtures of identical weights of phenol/o-dichlorobenzene calibrated by light scattering) within the range from 2000 to 18,000, preferably from 4000 to 15,000.

In the second stage, the polycarbonate is produced by polycondensation, by further increasing the temperature to 250–320° C., preferably to 270–295° C. at a pressure of <2 mbar. The remainder of the vapors is removed from the process in the course of this procedure. The combined vapors are subsequently worked up according to the invention, and phenol and DPC are preferably recycled to the process for example phenol into the production of BPA or DPC, DPC back into the polycarbonate production, but can be used for other purposes, too.

Catalysts in the sense of the process according to the invention include all inorganic or organic basic compounds, for example: lithium, sodium, potassium, calcium, barium and magnesium hydroxides, carbonates, halides, phenolates, bisphenolates, fluorides, acetates, phosphates, hydrogen phosphates and borohydrides, nitrogen and phosphorus containing compounds such as tetramethylammonium hydroxide, tetramethylammonium acetate, tetramethylammonium fluoride, tetramethylammonium tetraphenylborate, tetraphenylphosphonium fluoride, tetraphenylphosphonium tetraphenylborate, tetraphenylphosphonium phenolate, dimethyldiphenylammonium hydroxide, tetraethyl ammonium hydroxide, DBU, DBN or guanidine systems such 1,5,7-triazabicyclo-[4,4,0]-dec-5-ene, 7-phenyl-1,5,7-triazabicyclo-[4,4,0]-dec-5-ene, 7-methyl-1,5,7-triazabicyclo-[4,4,0]-dec-5-ene, 7,7,-hexylidene-di-1,5,7-triazabicyclo-[4,4,0]-dec-5-ene, 7,7'-decylidene-di-1,5,7-triazabicyclo-[4,4,0]-dec-5-ene, 7,7'-dodecylidene-di-1,5,7-triazabicyclo-[4,4,0]-dec-5-ene or phosphazenes such as the phosphazene base $P_1$-t-Oct=tert.-octylimino-tris-(dimethylamino)-phosphorane, the phosphazene base $P_1$-t-butyl=tert.-butylimino-tris-(dimethylamino)-phosphorane, or BEMP=2-tert.-butylimino-2-diethylamino-1,3-dimethyl-perhydro-1,3-diaza-2-phosphorine. Tetraphenylphosphonium phenolate and/or sodium hydroxide, -phenolate and -bisphenolate are particularly preferred.

These catalysts are used in amounts of $10^{-2}$ to $10^{-8}$ mol with respect to 1 mol dihydroxy aryl compound.

The catalysts can also be used in combination (two or more) with each other.

If alkali/alkaline earth metal catalysts are used, it may be advantageous to add the alkali/alkaline earth metal catalysts later (e.g. after the synthesis of oligocarbonate by polycondensation in the second stage). The alkali/alkaline earth metal catalyst can be added, for example, as a solid or as a solution in water, phenol, oligocarbonate or polycarbonate. The use in conjunction of basic alkali or alkaline earth metal catalysts is not at variance with the aforementioned purity requirements for the reactants, since specific amounts of defined special compounds are added here.

The reaction of the dihydroxy aryl compound and of the diaryl carbonate to form polycarbonate in the sense of the process according to the invention can be conducted batchwise or continuously, and is preferably conducted continuously, for example in agitated vessels, thin film evaporators, falling film evaporators, cascades of agitated vessels, extruders, kneaders, simple disc reactors and high-viscosity disc reactors.

The aromatic polycarbonates produced by the process according to the invention should have average molecular weights Mw from 18,000 to 80,000, preferably from 19,000–50,000, as determined as determined by measuring the relative solution viscosity in dichloromethane or in mixtures of identical weights of phenol/o-dichlorobenzene calibrated by light scattering.

Within the industrially applicable process of producing polycarbonate via transeterification of BPA and DPC, the separation of DPC and phenol according to the invention is effected from the vapor streams, generally under the following conditions (see FIG. 1):

In column 1 of the separation sequence, phenol is produced from the feed of vapors. This column operates within a pressure range of 5–100 mbar, which corresponds to a temperature range of 65° C. at the top to 220° C. in the bottom product of the column. The preferred working range is 20–30 mbar, with a corresponding temperature range of 80–190° C. The requisite reflux ratio in order to obtain high-purity phenol falls within the range from 0.2–2, preferably 0.2–0.5.

Column 2, which is employed for the removal of high-boiling fractions, also operates within a pressure range of 5–100 mbar, which is equivalent to a temperature range of 140–230° C. over the column. The pressure range is most preferably 10–20 mbar here also, i.e. corresponding to a temperature range of 160–200° C.

The working range of column 3, from which DPC as a bottom product, also falls within the pressure range from 5–100 mbar, corresponding to temperatures between 120 and 220° C. The preferred working range falls between 15 and 25 mbar, corresponding to a preferred temperature range from 135–195° C. In order to separate components with intermediate boiling ranges, the reflux ratios fall between 2 and 40, and are preferably within the range from 10–20.

The purity of the phenol is then >99%, preferably >99.8%, most preferably >99.95%, and that of the DPC is >99.0%, preferably 99.5%, most preferably >99.9%.

The examples below illustrate the process according to the invention, but do not limit it.

EXAMPLES

Example 1

The reaction vapors from a pilot plant for the production of SPC were produced at a rate of 22.8 kg/hour. Separation of phenol was effected by means of a column of 180 mm diameter. The concentrating part and stripping part were packed with fine vacuum packing. Condensation was effected in a condenser which was operated using cooling water at 40° C. The top pressure of the phenol column was 23 mbar, corresponding to a boiling temperature of 83° C. The reflux ratio was selected as 0.54. The purity of the phenol was >99.95%. The bottom product still contained 1% phenol at a temperature of 175° C. The DPC content was 94.9%, and the mass flow thereof was 4 kg/hour. The column was operated with a steam-heated falling film evaporator.

The bottom product was fed into the middle of the column for discharging the high-boiling fraction. The concentrating and stripping parts of the column each consisted of 1 meter of laboratory fine vacuum packing, and the column diameter was 80 mm over the entire length thereof. Condensation was effected using water at 80° C. The top pressure of 18 mbar corresponded to a temperature of 174° C. The phenol concentration increased to 3% as the reaction progressed, and the DPC concentration of the distillate was 96.8%.

At a bottom product temperature of 198° C., the discharged mass flow of bottom product of 338 g/hour still contained 48% DPC. After-reaction still always resulted in a phenol concentration in the bottom product of 0.8%. The column was heated via a glass falling film evaporator, which was supplied with diethylene glycol vapor at 220° C. The distillate from the high-boiling fraction column was fed to the DPC column. 2.5 m of laboratory fine vacuum packing were installed in the concentrating part of the column, and 2 m of laboratory fine vacuum packing were installed in the stripping part. Condensation was again effected using water at 80° C., and evaporation of the bottom product was again effected in a glass falling film evaporator. A vacuum of 34 mbar was applied to the column top, the top temperature was 170° C., and the reflux ratio was 15. In the distillate, which was discharged at 90 g/hour, the DPC concentration was 45%. After-reaction of the oligomers in the high-boiling fraction column resulted in an increase in the mass flow of both phenol and DPC during the test. The mass flow of DPC of 3500 g/hour which was discharged as the bottom product at 195° C. was recycled to the reaction. After a recycle period of 1 week, the final polycarbonate product had a concentration >99.95% and a Hazen color of about 5, and no change in the color thereof was determined.

The behaviour of the diphenyl carbonate during transesterification was employed as an additional characteristic for assessing the suitability thereof for producing polycarbonate. The reaction mixture comprising 17.1 g (0.075 mol) 2,2-bis-(4-hydroxyphenyl)-propane and 17 g (0.07945 mol)

of the diphenyl carbonate to be tested was treated in a 100 ml flask with 0.0001 mol % NaOH (with respect to 2,2-bis-(4-hydroxyphenyl)-propane) as a 1% aqueous solution, and was then placed in an oil bath which had been preheated to 270° C. The temperature at which separation of phenol commenced was determined, as was the time after immersion in the oil bath to the commencement of said separation; these parameters were compared with standard values (given below in brackets). Distillation of phenol from the reaction mixture comprising diphenyl carbonate which had been obtained as the bottom product commenced at 257° C. (<260° C.) after 12.5 minutes (<15 minutes). Based on the analysis results, on the pilot plant test results and on its behaviour during transesterification, the diphenyl carbonate produced in the sequence of separations by distillation was thus suitable for the production of polycarbonate.

Example 2

Side Stream Take-off of DPC

The quantitative and operating conditions in the phenol column corresponded to those of Example 1. The difference was that only 3 kg/hour of the bottom product from the phenol column was fed to the high-boiling fraction separation stage, the excess being discarded. The operating conditions of the high-boiling fraction column were altered to a top pressure of 12 mbar, which corresponded a temperature of 163° C. In the bottom product, at a DPC concentration of 52%, the temperature was 190° C. The mass flow of bottom product was 251 g/hour, corresponding to the conditions in Example 1. The distillate from the high-boiling fraction—column was fed to the DPC column. The rate of distillate take-off from the DPC column was 65 g/hour, which therefore approximated to the conditions in Example 1. The variation consisted of taking off DPC as a vapor above the falling film evaporator. The mass flow of condensed DPC was 2.6 kg/hour, the concentration was >99.95% and the Hazen color was <5. Side stream condensation was effected using water at 80° C., and DPC was discharged into interchangeable vessels. Positive results were obtained from the standard transesterification test. The starting temperature was 256° C., and the start time was 12.5 minutes. The excess mass flow of 84 g/hour which was taken off with the bottom product, which was necessary for the operation of the falling film evaporator, exhibited a slight yellow hue due to its long residence time in the falling film evaporator.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the melt transesterification reaction of diaryl carbonate with dihydroxy aryl compound, the improvement comprising in sequence steps:

(i) introducing the resulting vapor stream at the mid-height of a first distillation column;

(ii) separating the vapor stream into a top product containing high purity monohydroxy aryl compound and a first bottom product;

(iii) recycling the high purity monohydroxy aryl compound of (ii) to the reaction;

(iv) introducing the first bottom product at mid-height of a second distillation column;

(v) separating said first bottom product into high boiling bottom by-product and overhead remaining constituents;

(vi) introducing the overhead remaining constituents at mid-height of a third distillation column;

(vii) separating said overhead remaining constituents into overhead low-boiling fractions and bottom product or side stream product that contains diaryl carbonate product; and (viii) recycling the diaryl carbonate product directly to the transesterification reaction.

2. The process of claim 1 wherein the high purity mono hydroxy aryl compound has a purity of greater than 99%.

3. The process of claim 1 wherein the diaryl carbonate of step (vii) has a purity of greater than 99%.

4. The process of claim 1 wherein the diaryl carbonate of step (vii) is characterized by a Hazen color of less than 5.

* * * * *